# 3,476,707
PRODUCTION OF HIGH-ORTHO NOVOLAK RESINS

Harry M. Culbertson, Wilbraham, Mass., and Alan David Buchanan, Rosanna, Victoria, Australia, assignors to Monsanto Chemicals (Australia) Limited, West Footscray, Victoria, a company of Australia
No Drawing. Filed Dec. 15, 1967, Ser. No. 690,786
Claims priority, application Australia, Dec. 19, 1966, 15,436/66
Int. Cl. C08g 5/08
U.S. Cl. 260—57  16 Claims

ABSTRACT OF THE DISCLOSURE

Process for the production of so-called high ortho phenol-aldehyde novolac resins involving heating a phenol with aldehyde in the presence of a divalent electro-positive oxide or hydroxide or salt and a divalent electropositive metal halide or halogen acid.

BACKGROUND

Conventional novolak resins, prepared from phenolic compounds such as phenol and a source of formaldehyde, in the presence of strong acid catalysts such as sulfuric acid or hydrochloric acid or oxalic acid, are characterized by having a preponderance of para/para and ortho/para methylene bridges as illustrated below:

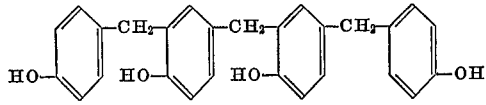

whereas the so-called "high ortho" novolak resins are characterized by having mostly ortho/ortho methylene bridges as illustrated below:

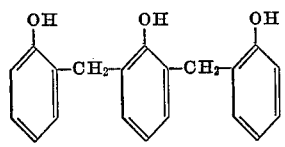

the main advantage of the "high ortho" novolak resins being the much greater speed of cure when reacted with hexamethylenetetramine. "High ortho" novolak resins are commonly prepared by reacting phenolic compounds such as phenol and a source of formaldehyde in the presence of either a divalent metal oxide (e.g. MgO and ZnO) or an organic acid salt of a divalent metal (e.g. zinc acetate or magnesium acetate) catalyst system. This invention relates to the production of so-called "high ortho" novolac resins, which are identifiable as being heat-hardenable phenol-formaldehyde resins of enhanced hardening speed.

We have found that in the production of novolak resins, a catalyst system comprising (i) an oxide or hydroxide or organic acid salt of a divalent electropositive metal, and (ii) a halogen acid or halide of a divalent electropositive metal, is particularly effecting in promoting "high ortho" orientation in the formation of the resins, with a significant increase in yield and lowering of processing temperature.

Thus, in accordance with the present invention there is provided the process for the production of "high ortho" novolak resins which comprises heating phenol or a meta-alkylphenol in molar excess with a source of formaldehyde, in the presence of a catalyst system comprising (i) an oxide or hydroxide or organic acid salt of a divalent electropositive metal, and (ii) a halogen acid or halide of a divalent electropositive metal, said catalyst system components (i) and (ii) being at least partially soluble in the reaction mixture, and said catalyst system components (i) and (ii) being present in such amount that the pH of the reaction mixture is maintained between pH 4 and pH 7.

Divalent electropositive metals of oxides or hydroxides or organic acid salts and halides employed in accordance with the invention, can be calcium ($Ca^{++}$), barium ($Ba^{++}$), strontium ($Sr^{++}$), magnesium ($Mg^{++}$), zinc ($Zn^{++}$), manganous ($Mn^{++}$) manganese, cadmium ($Cd^{++}$), cobaltous ($Co^{++}$) cobalt and plumbous ($Pb^{++}$) lead. Preferred metals are magnesium ($Mg^{++}$), zinc ($Zn^{++}$) and manganous ($Mn^{++}$) manganese. Halides employed in accordance with the invention can be the chloride, bromide or iodide, the preferred halide being chloride. Halogen acids employed in accordance with the invention can correspondingly be hydrochloric, hydrobromic or hydriodic acid, the preferred acid being hydrochloric acid. An example of a particularly effective catalyst system in accordance with the invention is a mixture of zinc oxide and zinc dichloride. An equally effective alternative to a mixture of oxide and halide is a mixture of the oxide and the appropriate halogen acid, for example a mixture of zinc oxide and hydrochloric acid. The catalyst system of the invention can comprise a mixture of the oxide or hydroxide or organic acid salt and a halide of different divalent electropositive metals.

We prefer to employ an oxide of a divalent electropositive metal with the halide or halogen acid as specified, rather than an organic acid salt of a divalent electropositive metal with the halide or halogen acid as specified. When an organic acid salt is employed, it is preferred that it be a salt of an aliphatic monocarboxylic acid such as formic acid or acetic acid, however, the salt can also be derived from an aliphatic hydroxycarboxylic acid such as lactic acid, or the salt can be derived from aromatic carboxylic acids such as benzoic acid. Typical salts useful for the purpose of the invention are cadmium formate, zinc acetate, magnesium acetate, manganese acetate, lead acetate and zinc benzoate.

The effectiveness of the catalyst system according to the invention varies with respect to solubility limitations of the oxides or hydroxides or salts and the halides, and with respect to their ability to direct the condensation of the formaldehyde with the phenol or metal-alkylphenol, the relative amount of (i) oxide or hydroxide or salt, and (ii) halogen acid or halide as well as the total amount employed varying according to solubility and the necessity to maintain the pH in the pH 4 to pH 7 range. In general the amount of oxide or hydroxide or salt, calculated as percentage based on the amount of phenol or meta-alkylphenol, is within the range of 0.1 to 2.0%, the preferred amount being within 0.2 to 0.5%; in general the amount of halide, calculated as percentage based on the amount of phenol or meta-alkylphenol, is within the range of 0.05 to 2.0%, the preferred amount being within 0.2 to 1.0%; and in general the amount of halogen acid, calculated as percentage (100% acid) based on the amount of phenol or meta-alkylphenol, is within the range of 0.02 to 1.0%, the preferred amount being within 0.05 to 0.25%.

Meta-alkylphenols as well as phenol, form fast-curing novolak resins when reacted with a source of formaldehyde in accordance with the invention, the phenol and meta-alkylphenol materials including the commercial materials commonly used for the production of such resins. The source of formaldehyde includes conventional formalin solutions for the purpose, as well as materials such as paraformaldehyde, which produce formaldehyde under the conditions of the condensation reaction. The molar ratio of phenol to formaldehyde generally lies between 1.20:1 and 2:1, the preferred range being 1.25:1 to 1.45:1. The excess is kept above 1.20:1 in order to prevent gelation and is generally below 2:1 for economic reasons, another factor influencing the choice of molar excess being the molecular weight range generally desired for the resin.

Embodiments

The following practical examples illustrate the process of the present invention, Examples Nos. 1–8 being in accordance with the invention whilst Examples Nos. 1A, 1B, 2A, 2B, 5A and 7A are for purposes of comparison. In these examples a series of novolak resins were prepared from mixtures of phenol and 50% w./w. aqueous solution of formaldehyde. The molar ratio of phenol/formaldehyde was varied between 1.25:1 to 1.66:1. In each case all reactants were charged and heated to reflux, the reflux was maintained for three hours, then water and excess phenol distilled to a temperature of 125° C. The resin was refluxed for 1 hour at 125° C., then dehydrated further under vacuum to an end temperature of 125–135° C.

creases and an appreciable amount of trimethylol (structure V) derivative is formed. In the second stage the formation of benzyl ethers takes place as illustrated by the following:

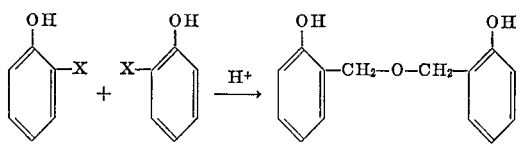

wherein X is $CH_2OH$, this reaction taking place only under mildly acidic conditions (pH 4 up to pH 7). In the third stage the formation of methylene bridges takes place through the breaking down of the benzyl ether and reaction with excess phenol which is present, and the condensation of free methylols, as illustrated by the following:

TABLE

| Example | Phenol/Formaldehyde | Catalyst | Catalyst Percentage on Phenol | pH | Reflux Time, Hrs. | Ending Temperature, °C. | Resin Yield Percentage on Phenol | Gel Time, Minutes |
|---|---|---|---|---|---|---|---|---|
| 1 | 1.33:1 | ZnO plus HCl | 0.26 0.10 | 5.4 | 3 | 130 | 104 | 5.3 |
| 1A | 1.33:1 | ZnO | 0.26 | 5.2 | 4½ | 160 | 86 | 1.2 |
| 1B | 1.33:1 | Zinc Acetate | 0.32 | 4.65 | 3 | 160 | 94 | 7.5 |
| 2 | 1.43:1 | ZnO plus HCl | 0.26 0.10 | 5.2 | 2 | 135 | 96 | 6.2 |
| 2A | 1.43:1 | ZnO | 0.26 | 5.6 | 4 | 160 | 91 | 5.0 |
| 2B | 1.43:1 | Zinc Acetate | 0.32 | 5.6 | 3 | 160 | 89 | 4.8 |
| 3 | 1.25:1 | ZnO plus HCl | 0.26 0.10 | ------ | 3 | 125 | 105 | 6.2 |
| 4 | 1.66:1 | ZnO plus $ZnCl_2$ | 0.53 0.13 | 5.3 | 2 | 160 | 90 | 7.5 |
| 5 | 1.43:1 | ZnO plus $ZnCl_2$ | 0.53 0.13 | 5.6 | 2 | 130 | 97 | 6.0 |
| 5A | 1.43:1 | $ZnCl_2$ | 0.2 | 2.5 | 8 | 165 | 97 | 15.2 |
| 6 | 1.43:1 | MgO plus HCl | 0.1 0.1 | 4.6 | 3 | 135 | 85 | 7.1 |
| 7 | 1.33:1 | ZnO plus $MnCl_2$ | 0.25 0.30 | 5.8 | 3 | 125 | 90 | 5.2 |
| 7A | 1.33:1 | $H_2SO_4$ | 0.1 | <2.0 | 2 | 120 | 103 | 17.35 |
| 8 | 1.33:1 | Zinc Acetate plus HCl | 0.31 0.08 | 4.15 | 4 | 135 | 103 | ------ |

The "Gel Time" characteristics referred to in the foregoing table were determined by dissolving 1 g. of resin and 0.13 g. hexamine in 4.2 g. benzyl alcohol and heating in an oil bath at 135° C.

Preparation of "high ortho" novolak resins in accordance with the invention is seen to be essentially a three stage process, the first stage being the formation of methylol derivatives as illustrated by the following:

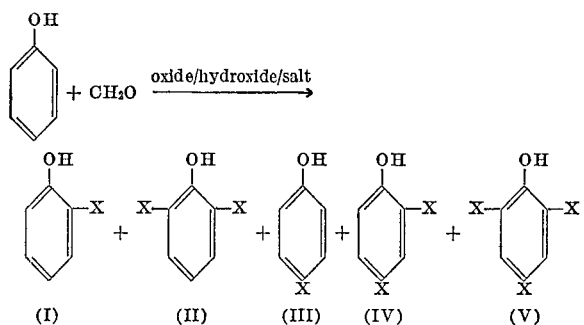

wherein X is $CH_2OH$. With the presence of the divalent oxides at pH of pH 4–7, orientation of methylols is predominantly ortho (structures I and II), whereas at pH greater than pH 7, the amount of para substitution in-

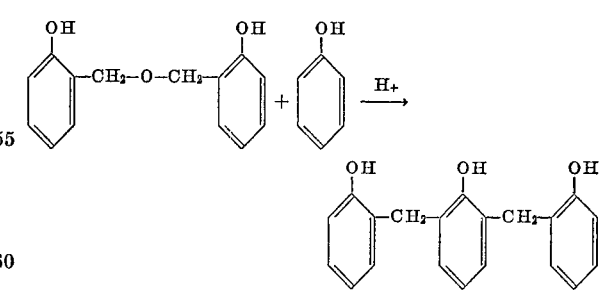

and we consider that it is in the third stage that the divalent metal halide or halogen acid effects a particularly valuable function. The stability of the benzyl ethers is quite pronounced, thus when the prior art organic acid salts or oxides are employed alone, which materials probably are present in the form of the phenate salts, temperatures of up to 160° C. are required. On the other hand, we have found that the presence of the halide or halogen acid catalyzes the decomposition of the benzyl ethers at temperatures as low as 115° C. The pH range specified above is critical in this reaction, since if greater than pH 7, a base-catalyzed condensation takes place, with poor control of orientation and possible gelation at the lower phenol/formaldehyde ratios, whilst if the pH is below pH 4, the orientation is predominantly para, with subsequent loss of reactivity of the resin.

The relation of the above sequence of reactions to the actual processing steps described in the practical examples can be summarized as follows: Stage 1 (methylolation)—initial 3 hours reflux; Stage 2 (ether formation)—dehydration to 125° C.; and Stage 3 (condensation)—reflux at 125° C., in all cases a mixture of oxide or hydroxide or salt and halide being present whether the halogen is added in the form of the metal halide or the halogen acid. The role of the metal oxide or hydroxide or salt in the catalyst system is therefore seen to be (i) control of pH in the presence of the strongly acidic halides and (ii) increase in the concentration of metal ions which catalyze the initial stage (methylolation) of the reaction and control orientation in the initial and subsequent reaction stages. The role of the halide is seen to (i) increase in the concentration of metal ions, as above, and most importantly, (ii) catalyze the decomposition of the intermediate ether at much lower temperatures.

Lowering of the processing temperatures amounts to about 25–35° C., as indicated in the practical examples above. The lowering of the processing temperature is significant not only in relation to equipment limitations but also as to the concentration of formalin which can be employed, and ultimately, the minimum phenol/formaldehyde ratio which can be used, temperatures must above 100° C., requiring that water be distilled from the resin, or the use of a high pressure autoclave. During removal of water, some phenol is distilled, which reduces the phenol to formaldehyde ratio, and if the reduction is too great, gelation will occur. This problem is more severe with resins requiring a high end temperature to complete the reaction since a correspondingly greater amount of phenol is removed. In the past these high end temperatures have been achieved by use of high pressure autoclave, or increase in phenol-formaldehyde ratio, or use of paraform, however, all of these procedures tend to increase the cost of the resin.

The embodiments of the invention in which an exclusive property or privilege is claimed are defined as follows:

1. In a process for the production of phenol-aldehyde novolac resins of the class which is characterized by having a preponderance of ortho/ortho methylene bridges and which is prepared by heating an acid aqueous reaction mixture containing a material selected from the group consisting of phenol and meta-alkylphenols in molar excess with a source of formaldehyde, the improvement which comprises conducting such heating in the presence of a catalyst system comprising in combination:
   (a) a divalent electropositive metal compound selected from the group consisting of oxides of such metals, hydroxides of such metals, and organic acid salts of such metals, and
   (b) a halogen material selected from the group consisting of halogen acids and halides of divalent electropositive metals, said catalyst system being at least partially soluble in said reaction mixture, and said catalyst system being present in a total amount such that the pH of said reaction mixture is maintained between about 4 and 7.

2. The process of claim 1 wherein said catalyst system comprises (i) an oxide or hydroxide of a divalent electropositive metal and (ii) a halogen acid.

3. The process of claim 1 wherein said catalyst system comprises (i) an organic acid salt of a divalent electropositive metal and (ii) a halogen acid.

4. The process of claim 1 wherein said catalyst system comprises (i) an oxide or hydroxide of a divalent electropositive metal and (ii) a halide of a divalent electropositive metal.

5. The process of claim 1 wherein said catalyst system comprises (i) an organic acid salt of a divalent electropositive metal and (ii) a halide of a divalent electropositive metal.

6. The process of claim 1 wherein the divalent electropositive metal is magnesium ($Mg^{++}$) or zinc ($Zn^{++}$) or manganous ($Mn^{++}$) manganese.

7. The process of claim 1 wherein the halogen acid is hydrochloric acid; or the halide is chloride; or the organic acid salt is a formate or acetate or benzoate or lactate.

8. The process of claim 1 wherein the catalyst system consists of a mixture of zinc oxide and hydrochloric acid.

9. The process of claim 1 wherein the catalyst system consists of a mixture of magnesium oxide and hydrochloric acid.

10. The process of claim 1 wherein the catalyst system consists of a mixture of zinc acetate and hydochloric acid.

11. The process of claim 1 wherein the catalyst system consists of a mixture of zinc oxide and zinc dichloride.

12. The process of claim 1 wherein the catalyst system consists of a mixture of zinc oxide and manganous chloride.

13. The process of claim 1 wherein the amount of oxide or hydroxide or salt is within the range of 0.1 to 2.0% wt. based on the weight of phenol or meta-alkylphenol; or the amount of halogen acid (calculated as 100% wt. acid) is within the range of 0.02 to 1.0% wt. based on the weight of phenol or meta-alkylphenol; or the amount of halide is within the range of 0.05 to 2.0% wt. based on the weight of phenol or meta-alkylphenol.

14. The process of claim 13 wherein the amount of oxide or hydroxide or salt is within the range of 0.2 to 0.5% wt. based on the weight of phenol or meta-alkylphenol; or the amount of halogen acid (calculated as 100% wt. acid) is within the range of 0.05 to 0.25% wt. based on the weight of phenol or meta-alkylphenol; or the amount of halide is within the range of 0.2 to 1.0% wt. based on the weight of phenol or meta-alkylphenol.

15. The process of claim 1 wherein the molar ratio of phenol or meta-alkylphenol to formaldehyde is between 1.20:1 to 2:1.

16. The process of claim 15 wherein molar ratio of phenol or meta-alkylphenol to formaldehyde is between 1.25:1 to 1.45:1.

References Cited

UNITED STATES PATENTS

| | | | |
|---|---|---|---|
| 2,475,587 | 7/1949 | Bender et al. | 260—57 |
| 3,332,911 | 7/1967 | Huck | 160—57 |

OTHER REFERENCES

Journal of Applied Chemistry, vol. 7, 1957, pp. 676–689, Fraser et al.

WILLIAM H. SHORT, Primary Examiner

H. SCHAIN, Assistant Examiner

U.S. Cl. X.R.

260—29.3